(12) United States Patent
Takashima

(10) Patent No.: US 6,418,090 B1
(45) Date of Patent: Jul. 9, 2002

(54) BIASING MAGNET POSITIONING MECHANISM

(75) Inventor: Suguru Takashima, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 120 days.

(21) Appl. No.: 09/606,213

(22) Filed: Jun. 29, 2000

(30) Foreign Application Priority Data

Jun. 30, 1999 (JP) .......................................... 11-185389

(51) Int. Cl.⁷ .............................................. G11B 11/00
(52) U.S. Cl. ................. 369/13.21; 369/13.34; 369/244
(58) Field of Search ......................... 369/13.21, 13.34, 369/75.2, 13.2, 75.1, 77.2, 77.1, 244

(56) References Cited

U.S. PATENT DOCUMENTS

| | | | | |
|---|---|---|---|---|
| 4,993,009 A | * | 2/1991 | Shiho | 369/13 |
| 5,058,094 A | * | 10/1991 | Suzuki | 369/77.1 |
| 5,103,435 A | * | 4/1992 | Nemoto et al. | 369/13 |
| 5,224,079 A | * | 6/1993 | Inoue | 369/13 |
| 5,329,504 A | * | 7/1994 | Mukawa | 369/13 |
| 5,537,376 A | * | 7/1996 | Ikuma | 369/77.2 |
| 5,604,719 A | * | 2/1997 | Kakimoto et al. | 369/13 |
| 5,617,404 A | * | 4/1997 | Okada | 369/244 |
| 5,677,897 A | * | 10/1997 | Anada et al. | 369/13 |
| 5,751,518 A | * | 5/1998 | Konno et al. | 360/104 |
| 5,956,214 A | | 9/1999 | Shinozaki et al. | |

* cited by examiner

Primary Examiner—Tan Dinh
(74) Attorney, Agent, or Firm—Greenblum & Bernstein, P.L.C.

(57) ABSTRACT

A biasing magnet positioning mechanism for a magneto-optical disc drive is provided a cartridge holder, a cartridge holder moving mechanism and a biasing magnet. The biasing magnet is provided with a first contact portion on a side closer to a rotational axis of the magneto-optical disc and a second contact portion on a side farther from the rotational axis of the magneto-optical disc. When the cartridge holder is located at a loading position, at which data recording/reproducing of the magneto-optical disc is to be performed, the first and second contact portions contact the cartridge holder and the disc cartridge, respectively, to locate the biasing magnet at an operable position.

20 Claims, 13 Drawing Sheets

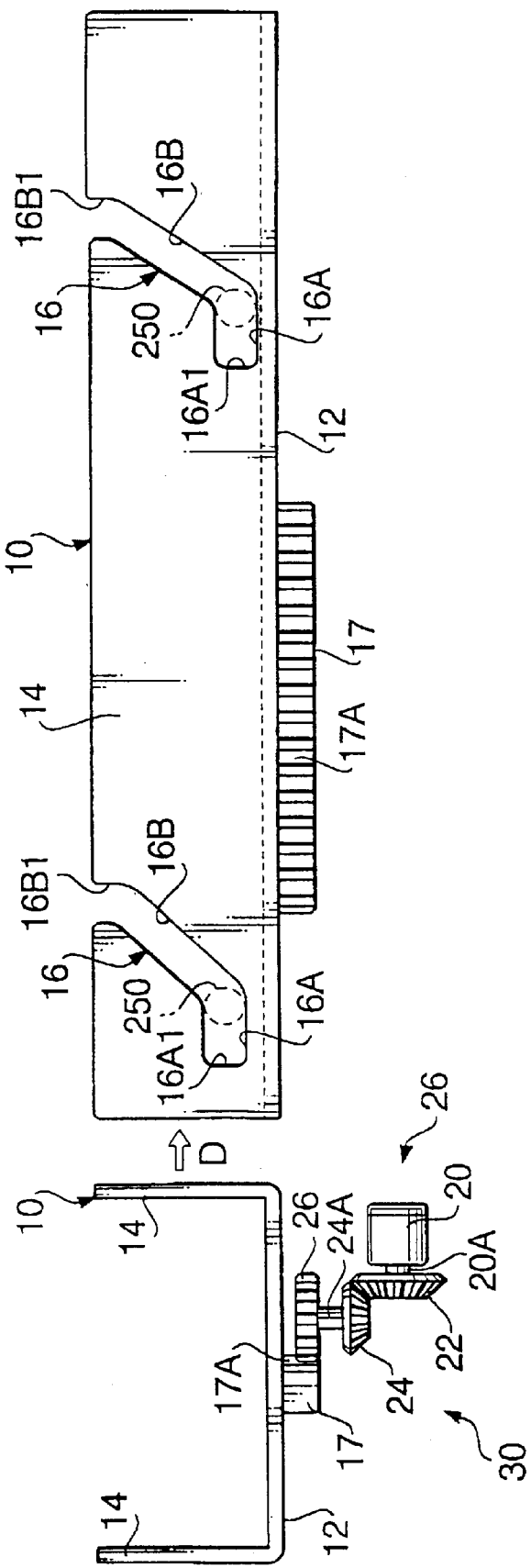

BIASING MAGNET POSITIONING MECHANISM

BACKGROUND OF THE INVENTION

The present invention relates to a mechanism for positioning a biasing magnet in a magneto-optical disc drive.

A magneto-optical disc drive is provided with a biasing magnet for applying a biasing magnetic field to a magneto-optical disc when data is recorded on the magneto-optical disc.

Generally, the biasing magnet has an elongated shape, which is positioned in parallel with one surface of the magneto-optical disc with a predetermined clearance with respect to the disc surface. The elongating direction of the magnet is aligned to the radial direction of the disc.

In order to perform the data recording operation stably, it is important that the magnetic field applied to the magneto-optical disc should be maintained constant. For this purpose, it is important that the biasing magnet accurately positioned when the data recording operation is performed.

In a conventional device, the biasing magnet may not be located at its operative position accurately due to individual manufacturing errors of the mechanism. That is, the distance between the biasing magnet and the disc and/or the degree of parallelization with respect to the disc surface are affected by individual differences of the size of a member used for positioning the biasing magnet. If the magnet is not accurately position, the data recording operation cannot be performed reliably.

SUMMARY OF THE INVENTION

It is therefore an object of the invention to provide an improved mechanism for accurately positioning a biasing magnet in a magneto-optical disc drive.

For this purpose, according to an aspect of the invention, there is provided a biasing magnet positioning mechanism for a magneto-optical disc drive, which includes a cartridge holder that detachably holds a disc cartridge accommodating a magneto-optical disc, the disc cartridge being formed with an opening for exposing a part of a surface of the magneto-optical disc accommodated therein, a cartridge holder moving mechanism that moves the cartridge holder, within a chassis, between a cartridge insertion/withdrawal position at which the disc cartridge can be inserted in or withdrawn from the cartridge holder, and a loading position at which data recording/reproducing operation can be performed, a biasing magnet for applying a magnetic field to a magneto-optical disc, the biasing magnet being provided with a first contact portion on a side closer to a rotational axis of the magneto-optical disc and a second contact portion on a side farther from the rotational axis of the magneto-optical disc, the first contact portion contacting the cartridge holder when the cartridge holder is located at the loading position, the second contact portion contacting the disc cartridge when the cartridge holder is located at the loading position, the biasing magnet being positioned to face the magneto-optical disc through the opening formed on the disc cartridge at a predetermined distance spaced from a surface of the magneto-optical disc when the first contact portion contacts the cartridge holder and the second contact portion contacts the disc cartridge.

According to another aspect of the invention, there is provided a magneto-optical disc drive, which employs the biasing magnet positioning mechanism described above.

Since the position of the biasing magnet is defined by contact between the first and second contact portions and the cartridge holder and the disc cartridge, respectively, the biasing magnet can be positioned accurately at an operative position with a relatively simple structure.

Optionally, the cartridge holder is moved from the insertion/withdrawal position to the loading position through a horizontal path horizontally extending from the insertion/withdrawal position and a vertical path extending downward from an end of the horizontal path.

Further optionally, a spindle motor for rotating the magneto-optical disc may be provided on the chassis, a positioning of the disc cartridge in the vertical direction being achieved by the chassis, a positioning of the magneto-optical disc in the vertical direction being achieved by the spindle motor.

Further more, there is provided a magnet supporting arm provided on the chassis for rotatably supporting the biasing magnet, the magnet supporting arm being rockable about an axis which is parallel to a surface of the magneto-optical disc and is perpendicular to a radial direction of the magneto-optical disc in which the biasing magnet extends.

In this case, the biasing magnet described above may be supported by the magnet supporting arm such that the biasing magnet is rockable about an axis which is parallel with the rotational axis of the magnet supporting arm, at a substantially central portion of the biasing magnet in its extending direction.

Still optionally, the magnet supporting arm is provided with a first engaging portion, the cartridge holder is provided with a second engaging portion to engage with the first engaging portion, the rocking movement of the magnet supporting arm being performed when the second engaging portion moves vertically.

In particular, the second engaging portion biases the first engaging portion such that the magnet supporting arm is located at the predetermined position when the cartridge holder is located at the loading position.

Preferably, the second engaging portion is formed with elastic material.

Optionally, the disc cartridge includes a housing on which the opening is formed, a shutter being provided for closing the opening, the second contact portion contacting a part of the housing when the cartridge holder is located at the loading position.

Furthermore, the disc cartridge includes a housing on which the opening is formed, a shutter being provided for closing the opening, the second contact portion contacting a part of the shutter when the cartridge holder is located at the loading position.

DESCRIPTION OF THE ACCOMPANYING DRAWINGS

FIG. 13A is a side view of a slide cam plate;

FIG. 13B is a front view of the slide cam plate, viewed from arrow D in FIG. 13A.

DESCRIPTION OF THE EMBODIMENT

Hereinafter, an embodiment of the invention will be described with reference to the accompanying drawings.

Firstly, the structure and operation of a magnet-optical disc drive, which is an embodiment of the invention, will be described, and then a detailed description of a structure and operation of a biasing magnet positioning mechanism, which is employed in the magnet-optical disc drive, will be given.

Figure 1:
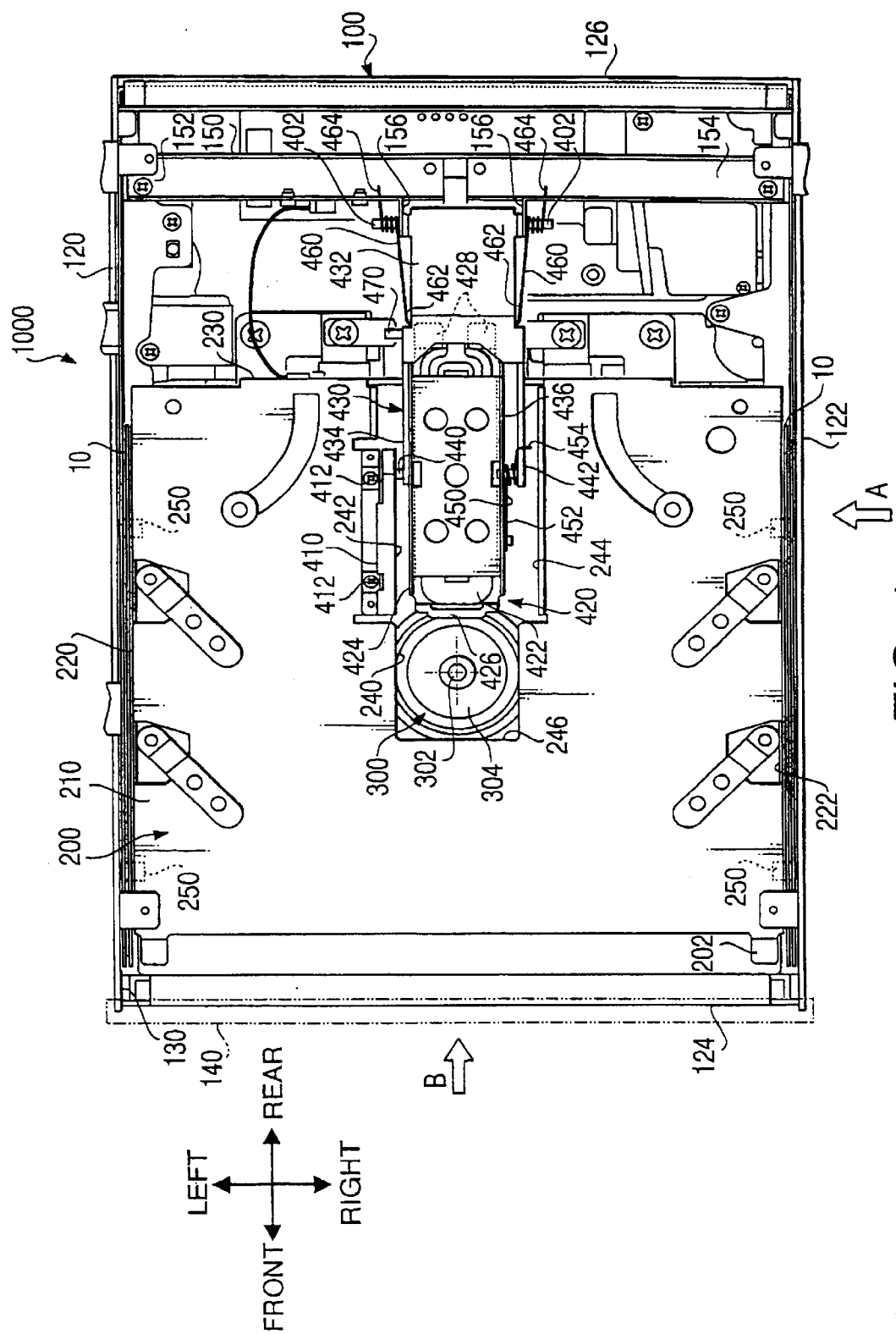
FIG. 1 is a plan view of a disc drive according to an embodiment of the invention when a disc cartridge has not been inserted.
Figure 2:
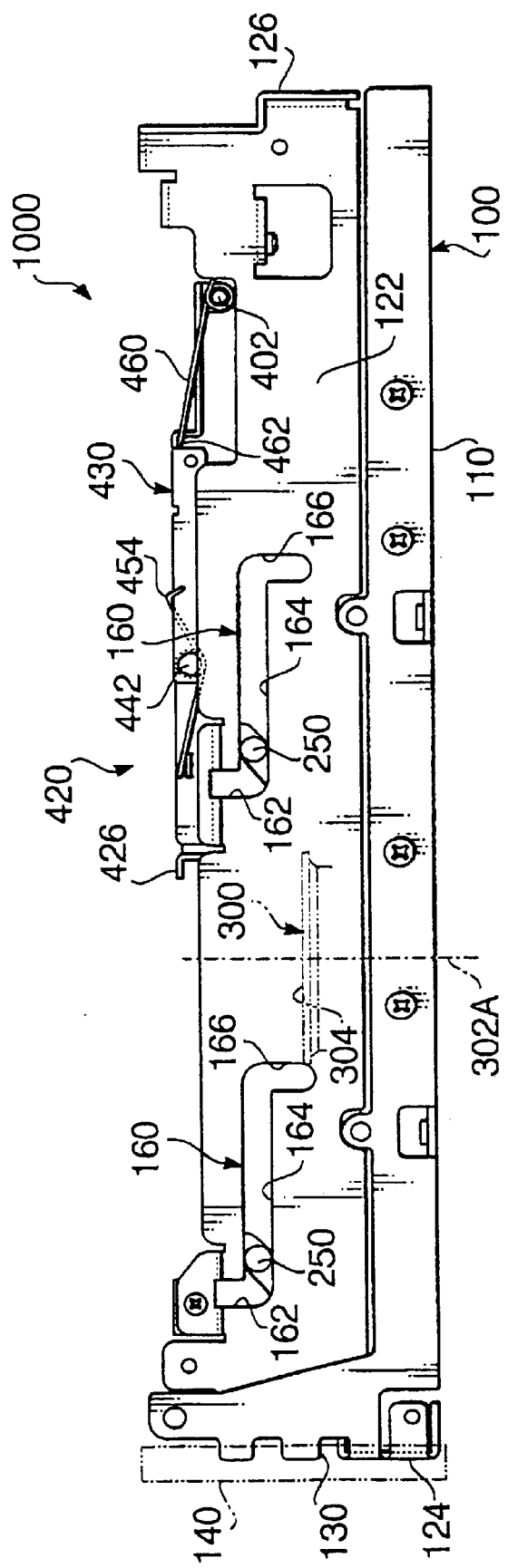
FIG. 2 is a side view of the disc drive shown in FIG. 1, viewed from arrow A in FIG. 1.
Figure 3:
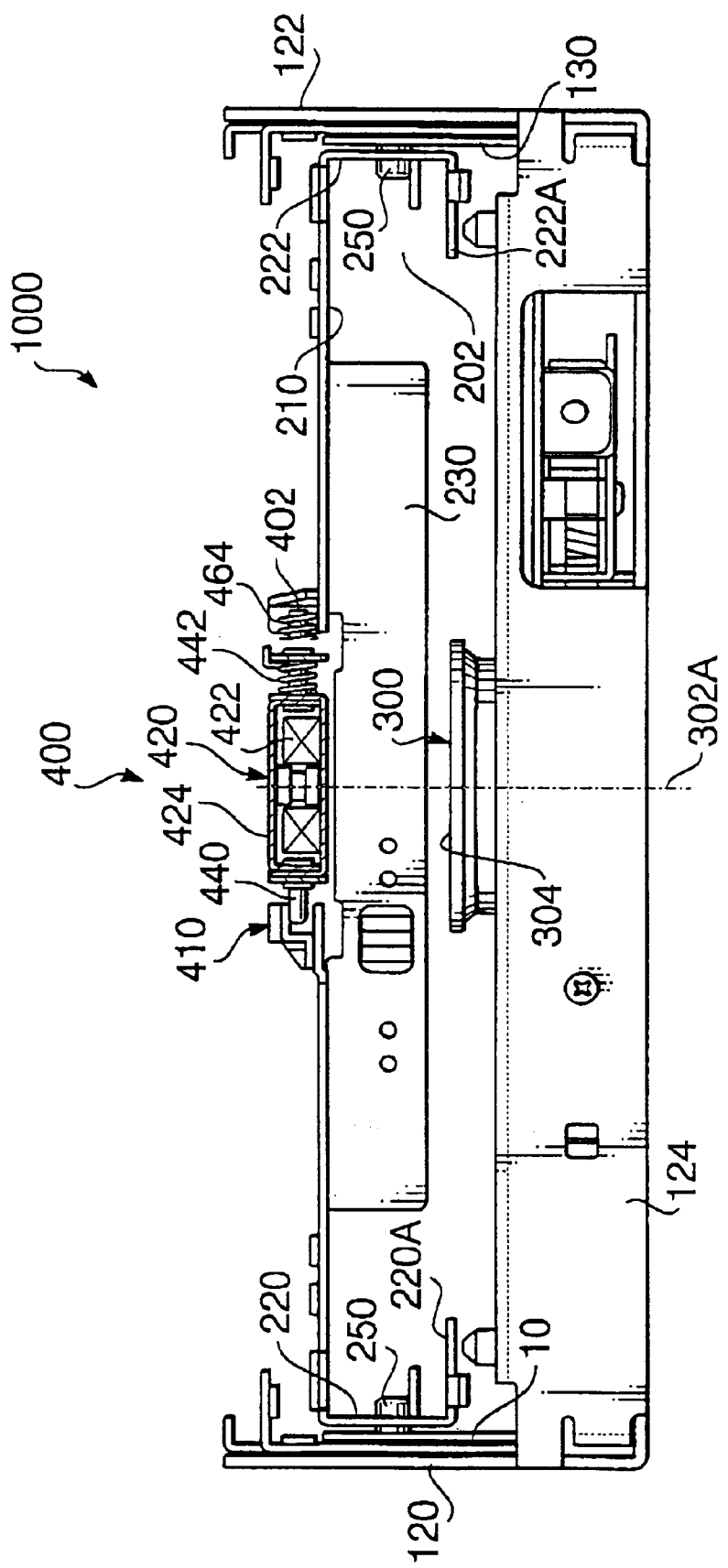
FIG. 3 is a front view of the disc drive shown in FIG. 1, viewed from arrow B in FIG. 1.
Figure 4:
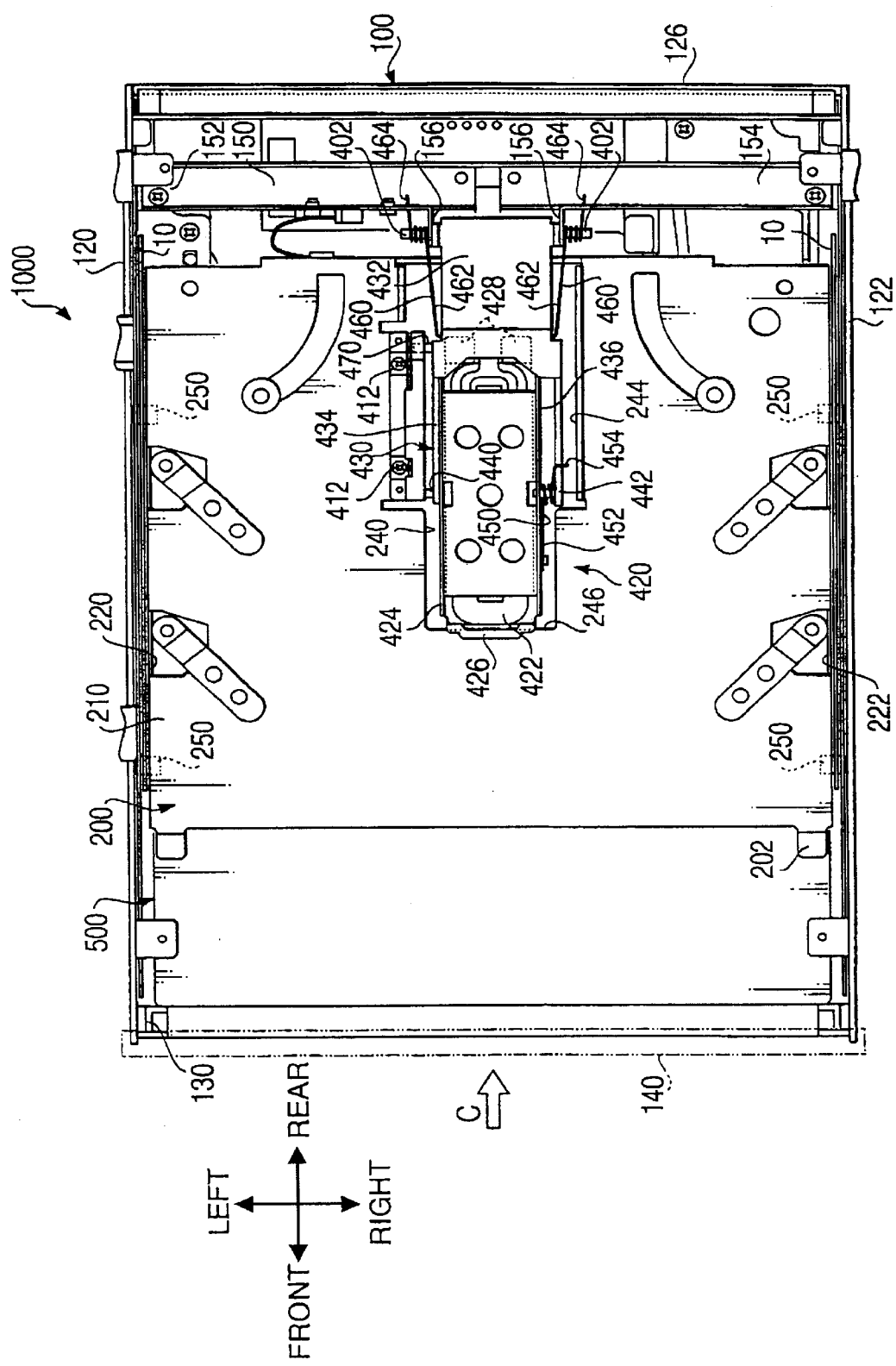
FIG. 4 is a plan view of the disc drive, which is similar to FIG. 1 except that the disc cartridge has been loaded in FIG. 4.
Figure 5:
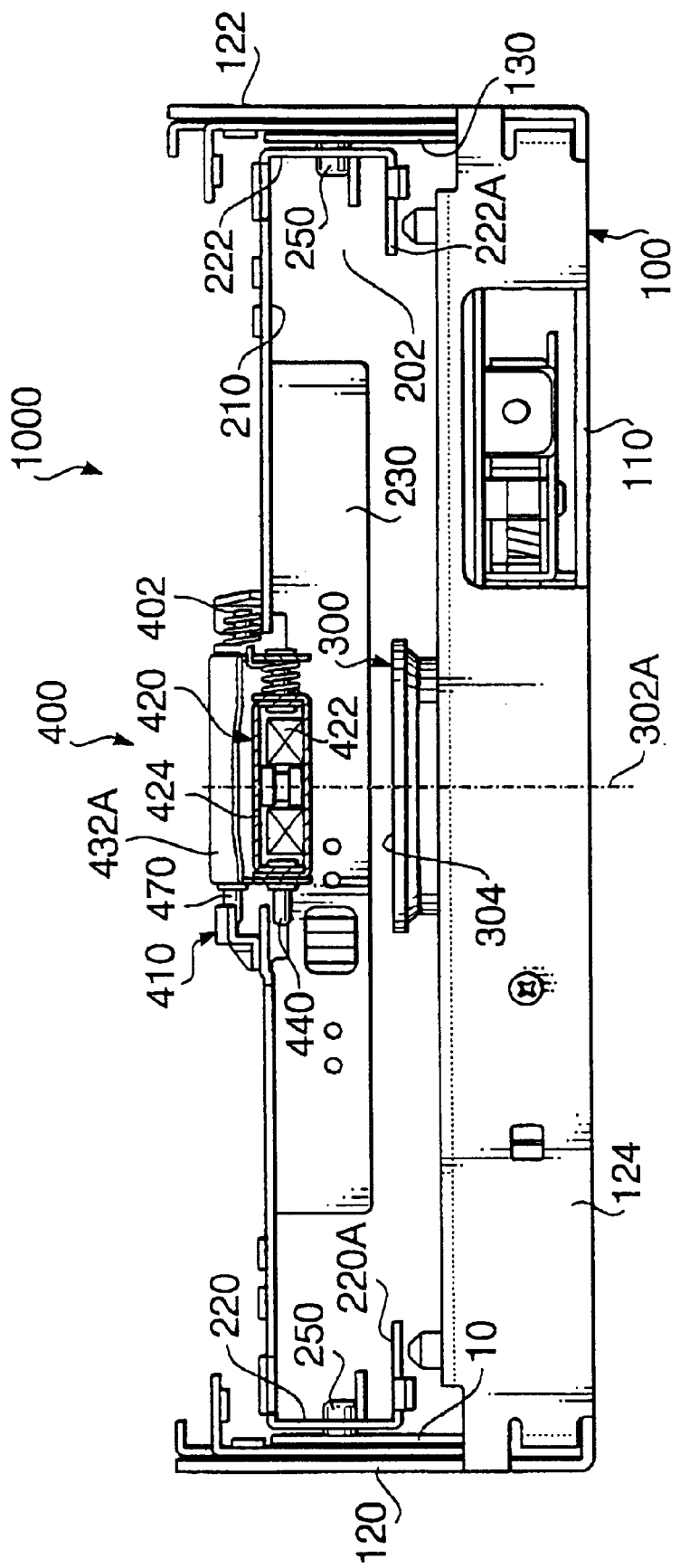
FIG. 5 is a front view of the disc drive shown in FIG. 4, viewed from arrow C in FIG. 4.

FIG. 1 is a plan view of a magneto-optical disc drive 1000 (hereinafter, referred to as disc drive) according to an embodiment of the invention. In FIG. 1, an upper cover of the housing is removed to show the inside structure. In FIG. 1, a disc cartridge accommodating a magneto-optical disc has not been inserted in the disc drive 1000. FIG. 2 is a side view of the disc drive 1000 viewed from arrow A in FIG. 1. FIG. 3 is a front view of the disc drive 1000 viewed from arrow B in FIG. 1. FIG. 4 is a plan view of the disc drive 1000, which is similar to FIG. 1 except that the disc cartridge has been loaded. FIG. 5 is a front view of the disc drive viewed from arrow C in FIG. 4. In FIG. 1, the left-hand side of the drawing will be defined as a front side of the disc drive 1000, the right-hand side of the drawing will be defined as a rear side of the disc drive 1000. Further, the upper side of the drawing is defined as a left side of the disc drive 1000, and the lower side of the drawing is defined as the right side of the disc drive 1000. According to the definition above, the right/left, front/rear, and up/down directions are indicated in each drawing. It should be noted that, when the disc drive 1000 is in use, the front/rear and right/left directions extend in the horizontal direction, and the up/down directions extend in the vertical direction.

The magneto-optical disc drive 1000 is provided with a slide cam plate 10, a chassis 100, a cartridge holder 200, a spindle motor 300, a biasing magnet positioning mechanism 400, and the like.

The chassis 100 includes a rectangular base plate 110, side walls 122 and 120 rising uprightly at the right and left sides of the base plate 110, and side walls 124 and 126 rising uprightly at front and rear sides of the base plate 110.

An upper periphery of the side wall 124, and front side peripheral portions of the side walls 120 and 122 define an insertion opening 130, through which a disc cartridge 500 is to be inserted. A shutter mechanism 140 is provided in front of the side wall 124 to close/open the insertion opening 130.

At rearward portions of the side walls 120 and 122, end portions 152 and 154 of a support member 150, which extends in a right-left direction, are fixed.

Figure 6:
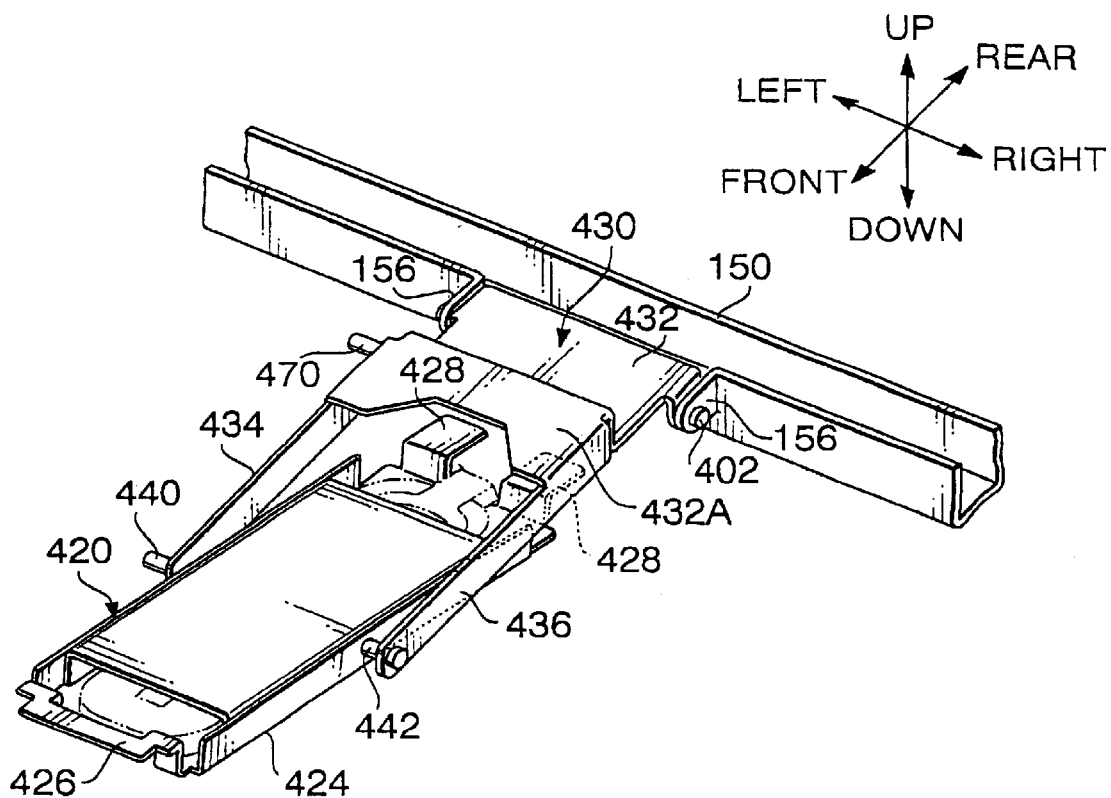
FIG. 6 is a perspective view of main parts of a biasing magnet positioning mechanism.

At a central portion of the support member 150, supporting projections 156 for supporting a supporting shaft 402, which extends in the right-left direction and rotatably supports a magnet supporting arm 430, are protruded toward the front side (see FIG. 6).

As shown in FIG. 2, on the right wall 122, a pair of cam grooves 160 are formed for guiding a pair of guide pins 250 protruded outward from the side plate 222 of the cartridge holder 200. The left wall 120 is also provided with the similar cam grooves 160 for guiding guide pins 250 protruded outward from the side wall 220 of the cartridge holder 200, at positions corresponding to the cam grooves 160 on the right wall 122.

Each cam groove 160 consists of a first groove 162 extending vertically, a second groove 164 starting from the lower end of the first groove 162 and extending horizontally, and a third groove 166 starting from the rear end of the second groove 164 and extending down vertically.

The cartridge holder 200 is arranged within a accommodation space defined by the chassis 100. The cartridge holder 200 includes a rectangular upper plate 210, the right and left side walls 222 and 220 respectively extending vertically down from right and left sides of the upper plate 210, and right and left supporting members 222A and 220A extending from the lower ends of the right and left side walls 222 and 220 in a direction in which the right and left supporting members 222A and 220A are approaching to each other, and a side plate 230 which extending vertically down from the rear end side of the upper plate 210.

The upper plate 210, the right and left side walls 222 and 220, and the right and left supporting members 222A and 220A define the accommodation space for accommodating the disc cartridge 500. The front side ends of the upper plate 210, the right and left side walls 222 and 220, and the right and left supporting members 222A and 220A define an opening 202 for receiving the disc cartridge 500.

Thus, the cartridge holder 200 holds the disc cartridge 500, which is inserted through the opening 202, by the upper plate 210, the right and left side walls 222 and 220, and the right and left supporting members 222A and 220A. The cartridge holder 200 holds the disc cartridge 500 with allowing insertion/withdrawal thereof through the opening 202.

On the upper plate 210 of the cartridge holder 200, a substantially rectangular cutout 240 is formed. The cutout 240 extends from the side, which is connected to the rear side wall 230, along the central axis extending in the front-rear direction, to a position slightly in front of the center of the upper plate 210.

The cutout 240 has right and left side edges 244 and 242 facing each other with respect to the central line extending in the front-rear direction, and has a side end 246 connecting the front end portions of the right and left side edges 244 and 242.

Further, on an upper surface of the upper plate 210, a cam member 410 is arranged along the side edge 242, and secured thereon with screws 412.

On the right and left side walls 222 and 220 of the cartridge holder 200, guide pins 250 are protruded. The guide pins 250 are to be slidably inserted in the cam grooves 160 formed on the side walls 120 and 122 of the chassis 100.

In order to allow the guide pins 250 to slide within the cam grooves 160, a slide cam plate 10 shown in FIGS. 13A and 13B is arranged between the chassis 100 and the cartridge holder 200.

Now the slide cam plate 10 will be described with reference to FIGS. 13A and 13B.

The slide cam plate 10 includes a rectangular bottom plate 12, and side plates 14 rising upward from the longer sides of the bottom plate 12. On each of the two side plates 14, a pair of cam grooves 16 having the same shape are arranged along the front-rear direction at a predetermined interval.

Each cam groove 16 includes a horizontal groove 16A located close to the bottom plate 12 and in parallel therewith, and an inclined groove 16B extending from the rear end of the horizontal groove 16A to an obliquely upward portion in the rear direction. That is, the groove 16B is closer to the bottom plate 12 at a position closer to the rear end of the horizontal groove 16A, and farther from the bottom plate 12 at a position farther from the rear end of the horizontal groove 16A.

The front end side of the horizontal groove 16A is defined as a side 16A1, and the opposite side of the cam groove 16, i.e., the upper end side of the inclined groove 16B is formed to be an opening 16B1 which is opened toward upside of the side plate 14.

The bottom plate 12 of the slide cam plate 10 is arranged between the base plate 110 of the chassis 100 and either of the supporting members 220A and 222A of the cartridge holder 200. The right and left side walls 14 of the slide cam plate 10 are located between the side wall 120 of the chassis 100 and the side wall 220 of the cartridge holder 200, and between the side wall 122 of the chassis 100 and the side wall 222 of the cartridge holder 200.

The positions of the cam grooves 16 of the slide cam plate 10 correspond to the positions of the cam grooves 160 formed on the side walls 120 and 122 of the chassis 100. Thus, the guide pins 250 are slidable in the cam grooves 160 formed on the side walls 120 and 122 through the cam grooves 16, and are slidable within the cam grooves 16, respectively.

On a lower surface of the bottom plate 12 of the slide cam plate 10, a rack 17 linearly extending along a central line extending the front-rear direction is provided. On the other hand, a motor 20 is provided to the chassis 100, and a bevel gear 22 is secured to a spindle shaft 20A of the motor 20. Another bevel gear 24 which is engaged with the bevel gear 22 is provided. The bevel gear 24 is secured to a rotation shaft 24A, which is rotatably supported by the chassis 100. Further. a gear 26 is secured to the shaft 24A, and is engaged with the teeth 16A of the rack 17.

Thus, when the motor 20 is driven and the spindle shaft 20A rotates, the rotational force is transmitted through the bevel gears 22 and 24, and the gear 26, to the rack 17, thereby the slide cam plate 10 moves in the front-rear direction, i.e., the insertion/withdrawal direction of the disc cartridge 500.

When the disc cartridge 500 is not inserted in the cartridge holder 200, or when the disc cartridge 500 has been ejected from the disc cartridge holder 200, each guide pin 250 is located at a left-hand side position of the corresponding second groove 164 as shown in FIG. 2. At this stage, in FIG. 13A, each pin 250 is located at an upper portion of the inclined groove 16B of the cam groove 16.

Figure 14A:
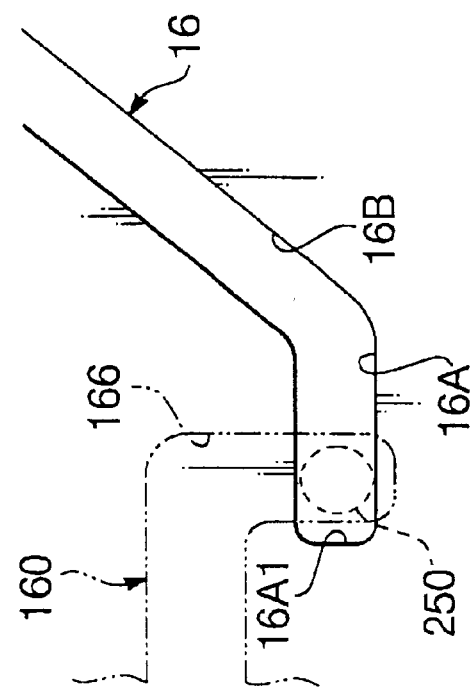
FIGS. 14A and 14B show operation of guide pins, the slide cam plate and cam grooves.

When the disc cartridge 500 is inserted, through the insertion opening 130, to the cartridge holder 200, and the insertion is detected by a sensor (not shown), the motor 20 is driven to move the slide cam plate 10 in the right-hand direction in FIG. 13A. Then, as shown in FIG. 14A, each guide pin 250 moves to slide along the second groove 164 to the right-hand side as pushed by the left-hand side edge of the inclined groove 16B. During this horizontal movement of the guide pins 250, the cartridge holder 200 is moved in the right-hand direction in FIG. 2.

When the guide pin 250 has reached the right-hand side end (i.e., rear end) of the second groove 164 and further contacts the right-hand side of the third groove 166, and when the slide cam plate 10 further moves in the right-hand side direction, the guide pin 250 moves downward as pushed by the left-hand side of the inclined groove 16B. Thus, the cartridge holder 200 moves downward.

When the guide pin 250 has reached the horizontal groove 16A of the slide cam plate 10, the downward movement of the guide pin 250 stops within the third groove 166, while the slide cam plate 10 further moves in the right hand side direction.

Figure 14B:
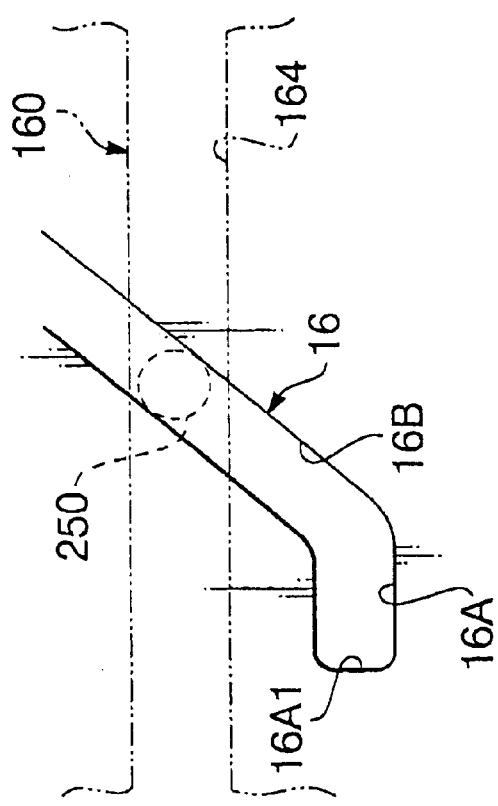

Finally, the guide pin 250 is located at a position closely adjacent to the side end 16A1 of the horizontal groove 16A of the slide cam plate 10 as shown in FIG. 14B, and the movement of the slide cam plate 10 is terminated.

When the cartridge 500 is to be ejected, the motor 20 is driven so that the slide cam plate 10, which is located at a position as shown in FIG. 14A, is moved to the front direction, e.g., in the left-hand side direction in FIG. 13A.

At an initial stage when the slide cam plate 10 moves in the left-hand direction, the guide pin 250 slides within the horizontal groove of the slide cam plate 10, and the guide pin 250 does not move with respect to the third groove 166. At this stage, the cartridge holder 200 is located at the lowermost position.

As the slide cam plate 10 is further moved in the left-hand direction, the guide pin 250 reaches the right-hand side end of the horizontal groove 16A, and then contacts the right-hand side of the inclined groove 16B. Then, the guide pin 250 is moved upward as pushed by the right-hand side edge of the inclined groove 16B since the horizontal movement of the guide pin 250 is restricted by the left-hand side edge of the third groove 166. At this stage, the cartridge holder 200 moves upward.

When the guide pin 250 moves up and has reached the second groove 164, i.e., the restriction of the left-hand side movement of the guide pin 250 by the third groove 166 is released, the guide pin 250 moves to the left-hand side along the second groove 164 as pushed by the right-hand side edge of the inclined groove 16B. During this movement, the cartridge holder 200 moves in the left-hand side direction.

When the guide pin 250 has reached a predetermined position closely adjacent to the left-hand side end of the second groove 164, the motor 20 is ceased, and the movement of the slide cam plate 10 in the left-hand side direction is terminated. At this stage, the cartridge holder 200 is located at a disc withdrawal position.

It should be noted that the motor 20, the bevel gears 22 and 24, the gear 26, the rack 17 and the slide cam plate 10 constitute a driving mechanism 30 for moving the cartridge holder 200 in the front-rear direction.

It should be noted that the inclination of the inclined grooves 16B of the slide cam plate 10 contribute to smooth movement of the guide pins 250 within the cam grooves 160, in particular, transition between vertical and horizontal movements of the cartridge holder 200.

The opening 16B1 of the inclined groove 16B is formed for allowing the guide pin 250 to be inserted in each cam groove 16 when the chassis 100, slide cam plate 10 and the cartridge holder 200 are assembled, and does not contribute to loading/unloading operation of the disc cartridge 500.

It should be noted that a path of the cartridge holder 200 when the guide pins 250 are guided by the second grooves 164 will be referred to as a horizontal path, and a path of the cartridge holder 200 when the guide pins 250 are guided by the third grooves 166 will be referred to as a vertical path.

A spindle motor 300 is arranged on an upper surface of the base plate 110. An axis 302A of a spindle shaft 302 of the spindle motor 300 extends in a direction perpendicular to the upper surface of the base plate 110. A hub portion of the magneto-optical disc 510 accommodated in the disc cartridge 500 is caught by a chucking section 304, thereby the disc is rotated by the motor 300. It should be noted that when the hub portion of the disc is caught by the chucking section 304, the spindle shaft 302 of the spindle motor 300 is inserted in a central hole formed on the magneto-optical disc 510.

The biasing magnet positioning mechanism 400 includes a cam member 410, a biasing magnet 420, a magnet support arm 430, a magnet support shaft 440, a pair of biasing members 460, a guide pin 470, and the like.

The biasing magnet 420, which is an electric magnet, includes a magnet body 422, which is formed to have a certain thickness, and the length corresponding to the radius of the magneto-optical disc 510, and a magnet holder 424 for holding the magnet body 422.

As shown in FIG. 6, the magnet holder 424 is provided with a first contact portion 426 at a front end side, and second contact portions 428 at a rear end side.

The magnet support arm 430 includes a body 432, supporting arms 434 and 436 extended from the body 432 to the front. The supporting arms 434 and 436 are spaced from each other in a direction perpendicular to their extending direction, and magnet supporting shafts 440 and 442 are provided at tip ends thereof, respectively. The magnet supporting shafts 440 and 442 extend in the direction perpendicular to the direction in which the supporting arms 434 and 436 extend.

Bearing holes are formed at a central portion of the side surfaces of the magnet holder 424. The supporting shafts 440 and 442 are fitted in the bearing holes of the magnet holder 424 so that the magnet 420 is rotatably supported by the supporting shafts 440 and 442, between the supporting arms 434 and 436.

The biasing member 450 has a coil spring, in which the supporting shaft 442 is inserted. An end 452 of the biasing member 450 is fixed on the magnet holder 424, and the other end 454 is fixed on the supporting arm 436. Due to the biasing force of the biasing member 450, the magnet 420 is biased such that the front side portion (i.e., the opening 130 side portion) of the magnet 420 with respect to the supporting shafts 440 and 442 is urged to be directed downward.

When the second contacting portions 428 of the magnet holder 424 contact the main body 432 of the magnet supporting arm 430 from down side due to the urging force of the biasing member 450, the magnet 420 maintains its position to be parallel with the extending direction of the supporting arm 430.

On the rear side portion of the body 432 of the magnet supporting arm 430, a bearing hole in which the supporting shaft 402 is to be inserted is formed. The magnet supporting arm 430 is rotatably supported about the supporting shaft 402.

The biasing member 460 includes coil springs surrounding the supporting shafts 402. One end 462 of the biasing member 460 is secured on the supporting arm 430, and the other end 464 is secured on the supporting member 150. Due to the biasing force of the biasing member 460, the magnet supporting arm 430 is biased upward with respect to the supporting shafts 402.

The magnet support shaft 440 fixed onto the supporting arm 434 of the magnet supporting arm 430 extends to a position facing the cam member 410. Due to the biasing force of the biasing member 460, the magnet supporting shaft 440 contacts the cam member 410, which prevents the magnet supporting arm 430 from moving upward further.

Figure 7:
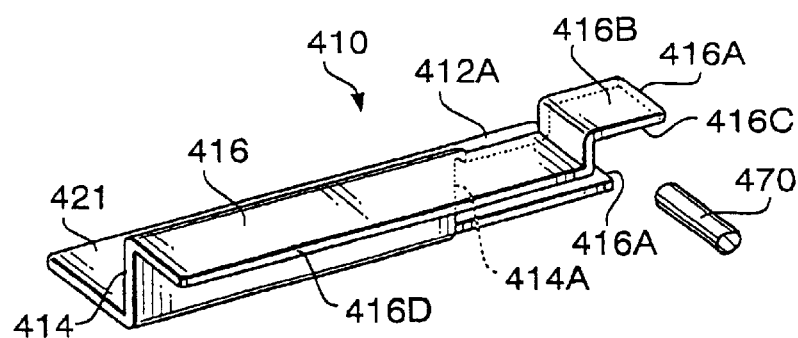
FIG. 7 is a perspective view of a cam member.

As shown in FIGS. 6 and 7, the guide pin 470 extends from the same side, where the magnet supporting shaft 440 is provided, of the body 432 of the magnet supporting arm 430 to a position facing the cam member 410. When the disc cartridge 500 is loaded, the guide pin 470 contacts the cam member 410 due to the biasing force of the biasing member 460.

The magnet 420 and the magnet supporting arm 430 are arranged at the cutout portion 240 of the cartridge holder 200.

The disc cartridge 500 has a housing which accommodates the magneto-optical disc and is provided with an opening, and a shutter for opening/closing the opening. Although the opening is not shown in the drawings, a relationship between the size of the opening and the positioning mechanism is as follows. A distance between the supporting members 434 and 436 is smaller than a width of the opening. Further, the length of the magnet 420 (excluding the first and second contact portions 426 and 428), in the radial direction of the disc, is smaller than the length of the opening, and the length of the biasing magnet 420 including the first and second contact portions 426 and 428, in the radial direction of the optical disc, is greater than the length of the opening. When the first and second contact portions 426 and 428 contact the peripheral portion 246 of the cutout portion 240 and the upper surface 504 of the housing 502, the magnet holder 424 and the supporting members 434 and 436 are located inside the opening.

Opposite to the magnet 420 with respect to the magneto-optical disc, an optical system for emitting a laser beam to record/reproduce data is provided. Such an optical system is well known, and is not the essential part of the present invention, description thereof will be omitted.

Next, a loading operation in which the disc cartridge 500 is inserted in the magneto-optical disc drive 1000 and then the disc cartridge 500 is located at a loaded position at which the reproducing/recoding of data can be performed will be schematically described.

As shown in FIGS. 1, 2 and 3, when the disc cartridge 500 has not yet been inserted, the cartridge holder 200 is located at a predetermined position. At this stage, each guide pin 250 is located at a predetermined position within the second groove 164 of the corresponding guide groove 160.

In this condition, the opening 202 of the cartridge holder 200 is located closely adjacent to the insertion opening 130 of the chassis 100. With this condition, it is possible to insert/withdraw the disc cartridge 500 in/from the cartridge holder 200. This position of the cartridge holder 200 will be referred to as a cartridge insert/withdraw position.

When the cartridge 500 is inserted, via the insertion opening 130 and the opening 202, into the cartridge holder 200, and the cartridge 500 Is further pushed in until the shutter is completely opened by a mechanism (not shown) for opening the shutter of the disc cartridge 500, the insertion of the disc cartridge 500 is detected by a sensor (not shown), and the driving mechanism 30 drives the slide cam plate 10 so that the cartridge holder 200 is moved rearward (in the right-hand direction in FIG. 1) with holding the disc cartridge 500.

When the guide pins 250 move along the second grooves 164, the cartridge holder 200 moves horizontally, and when the guide pins 250 move along the third grooves 166, the cartridge holder 200 moves down (see FIGS. 13A, 13B, 14A and 14B).

When the cartridge holder 200 is inserted and the shutter of the disc cartridge 500, which is held by the cartridge holder 200, is opened by the well-known shutter opening mechanism as described above, part of the upper and lower surfaces of the magneto-optical disc is exposed to outside.

When the cartridge holder 200 is further moved until the guide pins 250 stop at the lower end of the third grooves 166, the hub portion provided at the central portion of the magneto-optical disc is caught by the chucking section 304 provided at the spindle motor 300.

During the above movement of the cartridge holder 200, when the guide pins 250 slide along the second grooves 164, the magnet supporting shaft 440 of the magnet supporting arm 430 contacts the cam plate 410. Therefore, the magnet supporting arm 430 is held horizontally, and the magnet 420 is also held horizontally.

Figure 9:
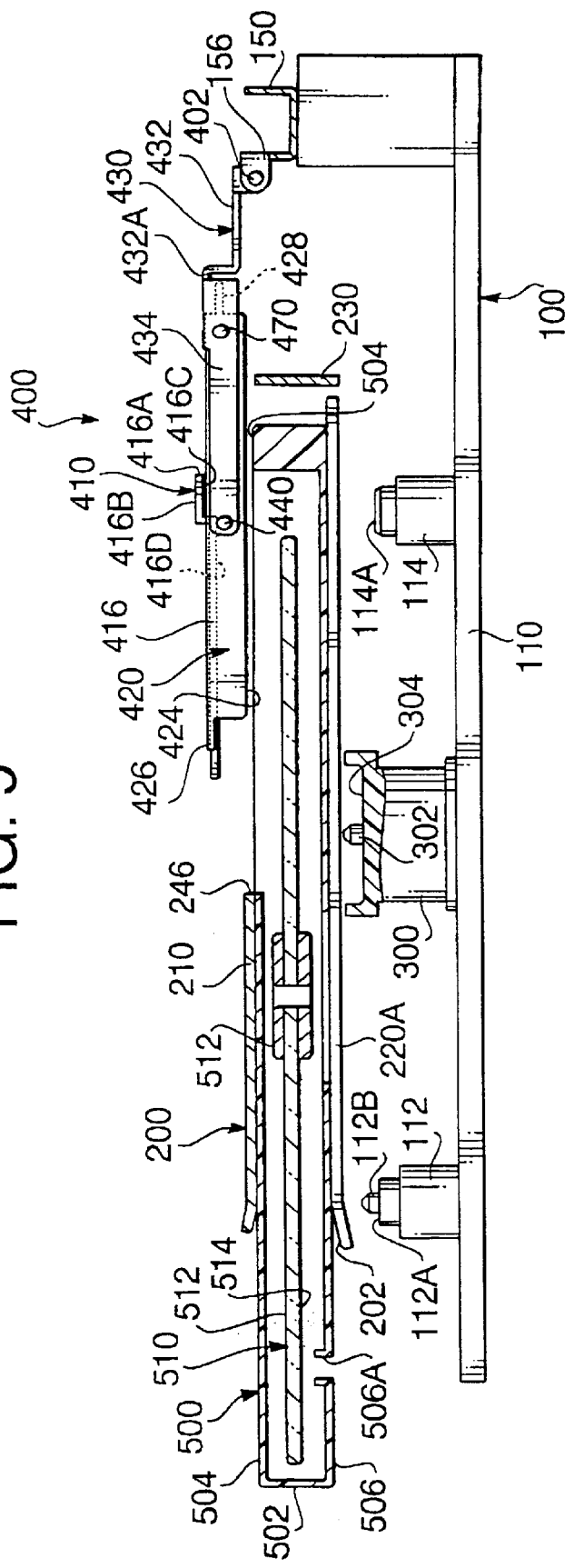
FIG. 9 shows a condition where the disc cartridge holder is located at insertion completion position.

At this stage, as shown in FIG. 9, the magnet 420 is retracted at a position spaced from the upper surface of the cartridge 500. Therefore, the magnet 420 does not interfere with the disc cartridge 500.

During the process in which the cartridge holder 200 moves, when the guide pins 250 move from the second grooves 164 to the third grooves 166, the guide pin 470 engages with the cam member 410. When the guide pins 250 moves within the third grooves 166, the guide pin 470 is urged downward. Thus, the magnet supporting arm 430 rocks downward about the supporting shafts 402, and the biasing magnet 420 approaches a surface of the magneto-optical disc accommodated in the disc cartridge 500 through the cutout portion 240 of the cartridge holder 200.

The magnet supporting arm 430 is further pushed downward by the cam member 410, and the first contact portion 426 of the magnet holder 424 finally contacts the peripheral portion 246 of the cutout portion 240 of the cartridge holder 200. With reaction thereof, the magnet supporting shaft 440 is pushed downward by the cam member 410, and the second contact portion 428 contacts part of the disc cartridge 500.

Figure 12:
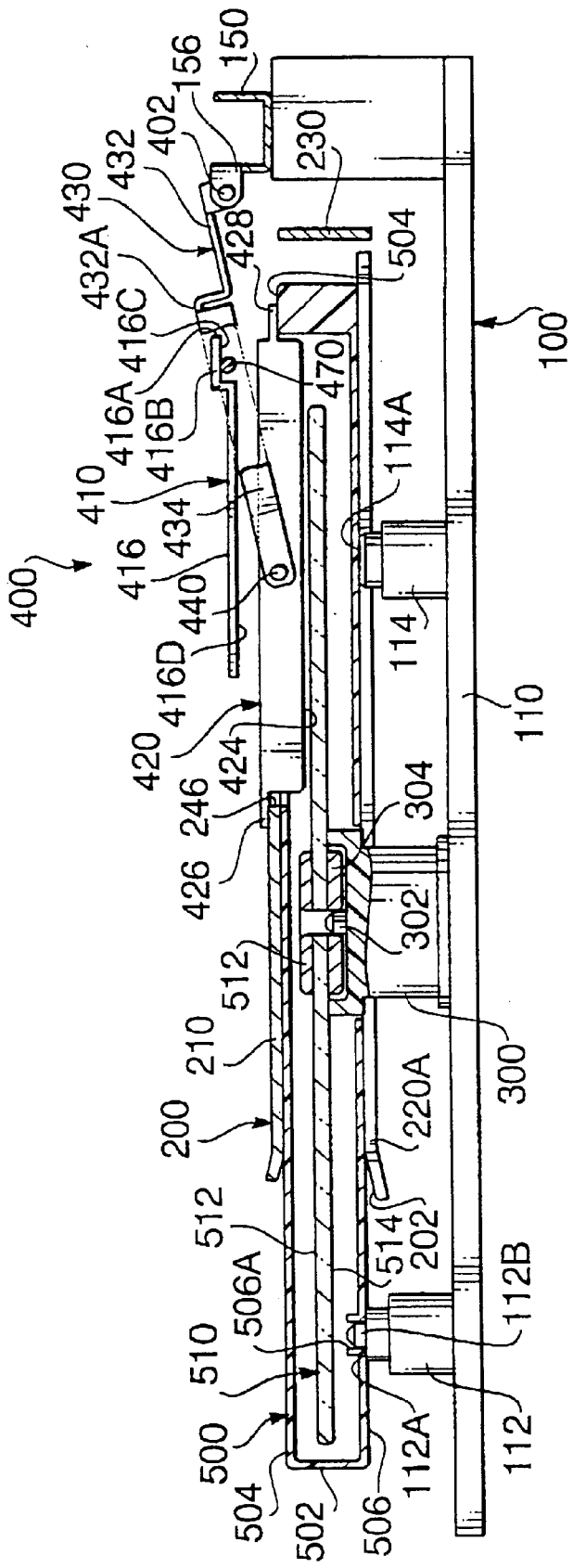
FIG. 12 shows a condition where the cartridge holder is located at a vertical movement completion position.

Then, as shown in FIG. 12, the magnet 420 is located at a predetermined position a predetermined amount spaced from the upper surface 512 of the magneto-optical disc 510, with maintaining the horizontally extending condition. At this stage, the data recording operation can be performed. The position of the cartridge holder 200 is referred to as the loading position.

It should be noted that when the cartridge holder 200 is moved back to a cartridge withdrawal position at which the disc cartridge 500 can be withdrawn from the insertion opening 130, substantially a reverse movement with respect to the above-described loading movement is performed.

Next, the biasing magnet positioning mechanism 400 will be described in detail hereinafter with reference to FIGS. 6–8.

As shown in FIG. 6, the main body 432 of the magnet supporting arm 430 has a rectangular shape, side end portions of which, at portions closer to the supporting member 150, are rotatably supported by the supporting shaft 402.

On a portion of the main body 432 farther from the supporting member 150, an intermediate portion 432A is provided. The intermediate portion 432A is formed such that it extends in a thickness direction of the main body 432, and then is bent in the horizontal direction.

The second contacting portions 428 of the magnet holder 424 contact the lower surface of the intermediate portions 432A and the rotation of the magnet holder 424 is restricted thereby.

At the side ends of the intermediate portion 432A. a air of supporting members 434 and 436 extend in a substantially horizontal direction. The interval between the supporting members 434 and 436 is greater than the width of the magnet 420, and smaller than the opening of the disc cartridge 500.

Figure 8:
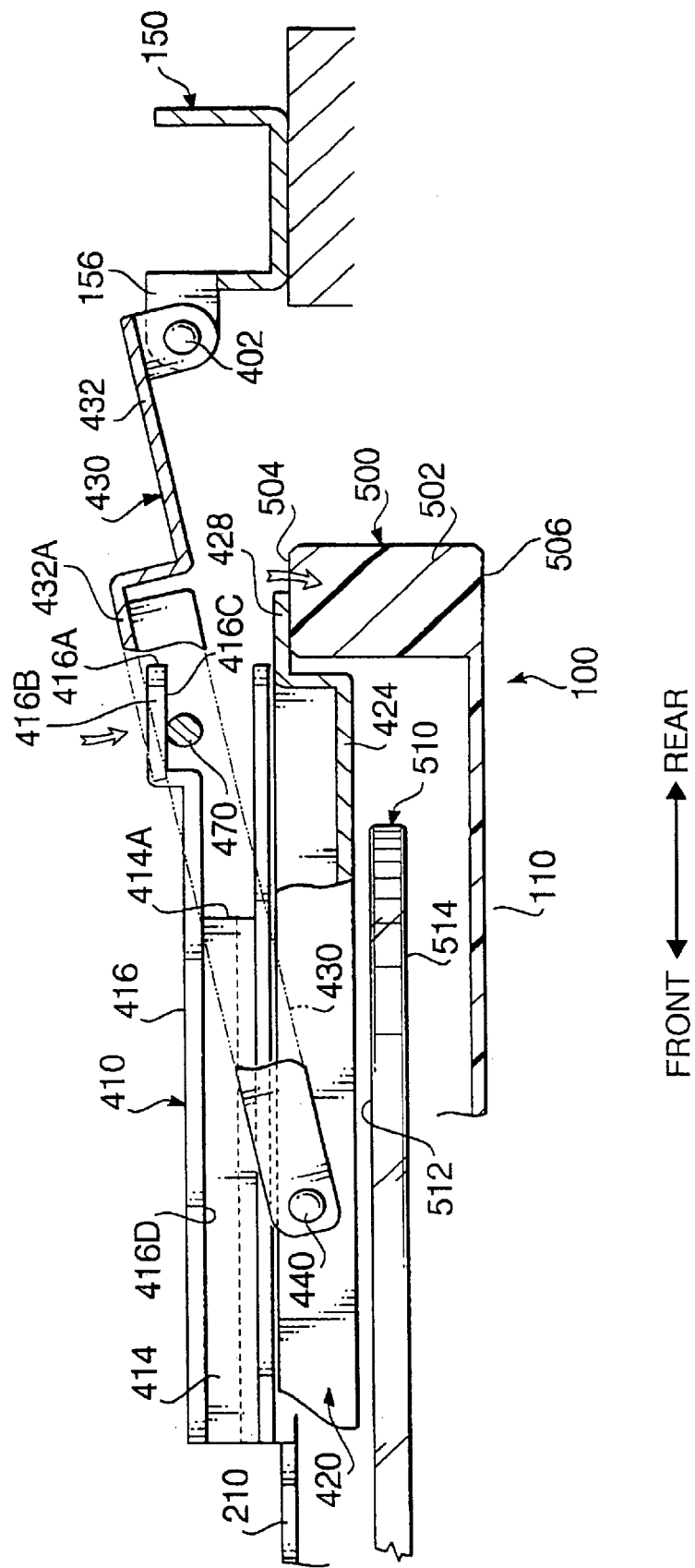
FIG. 8 shows an operation of the biasing magnet positioning mechanism.

As shown in FIG. 8, the magnet supporting shafts 440 and 442 are provided to protrude on the tip portions of the supporting members 434 and 436 along an axis parallel to the rotational axis of the magnet supporting arm 430. Each of the rotational axes of the magnet supporting shafts 440 and 442 and the rotational axis of the supporting shaft 402 extend in a direction perpendicular to the radial direction of the magneto-optical disc 510, on a plane parallel to the upper and lower surfaces 512 and 514 of the magneto-optical disc 510, whose hub is caught by the chucking section 304 of the spindle motor 300.

As shown in FIGS. 7 and 8, the cam member 410 has rectangular bottom plate 412 extending in the front-rear direction, a side plate 414 rising from one side of the bottom plate 412, and an upper plate 416 extends from the upper end of the side plate 414 in a direction of the thickness of the side plate 414. The cam member 410 is made of elastic material such as synthetic resin.

End portions 412A and 416A, which are closer to the supporting shaft 402, of the bottom and upper plates 412 and 416 extend outward with respect to the side portion 414A of the side plate 414. The extended portion of the upper plate 416 is provided with a stepped portion 416B having a step in the direction of the thickness of the upper plate 416.

The stepped portion 416B extends outward with respect to the side end portion 414A of the side plate 414, and has elasticity in the direction of the thickness thereof (i.e., in the up/down direction). The guide pin 470 is to contact the lower surface 416C of the stepped portion 416B. The magnet supporting shaft 440 is to contact a portion of the lower surface 416D other than the stepped portion 416B.

The disc cartridge 500 is manufactured in accordance with a predetermined standard. As shown in FIG. 8, the disc cartridge 500 has a housing 502 for accommodating the magneto-optical disc 510, and a shutter for opening/closing the opening formed on the housing 500, which are also manufactured at predetermined manufacturing tolerances in accordance with the standard.

For example, the distance between the upper surface 504 and the lower surface 506 of the housing 502 and the distance between the upper surface of the shutter and the lower surface of the shutter are determined to fall within the predetermined manufacturing tolerances.

Next, a structure for positioning the disc cartridge 500 at the loading position will be described with reference to FIGS. 9–12.

As shown in FIGS. 9–12, on a base plate 110 of the chassis 100, a cartridge positioning section 112, a cartridge receiving section 114 are formed, which are to contact the lower surface of the housing 502 of the cartridge 500.

The cartridge positioning section 112 includes a positioning pin 112B, which is to be inserted in a positioning hole 506A formed on the lower surface 506 of the housing 502 to determine the position of the cartridge 500 in the horizontal direction, and a positioning surface 112A, which contacts a peripheral portion of the positioning hole 506A to determine the position in the vertical direction.

The cartridge receiving section 114 has a positioning surface 114A, which contacts the lower surface 506 of the disc cartridge 500 at a position spaced from the cartridge positioning section 112 to determines the position in the vertical direction.

Thus, the lower surface 506 of the housing 502 contacts the cartridge positioning section 112 and cartridge receiving section 114, the horizontal and vertical position of the disc cartridge 500 with respect to the chassis 100 are determined.

Since the spindle motor 300 is secured on the base plate 110, when the hub 512 of the magneto-optical disc 510 is caught by the chucking section 304 of the spindle motor 300, the positioning of the magneto-optical disc 500 with respect to the chassis 100, in the horizontal and vertical directions, is achieved.

Thus, when the cartridge holder 200 is moved to the loading position, the housing 502 as well as the magneto-optical disc 510 are located at a predetermined position with respect to the chassis 100.

Next, operation of the biasing magnet positioning mechanism will be described with reference to FIGS. 9–12.

In FIG. 9, the opening 202 of the cartridge holder 200 is located closely adjacent to the insertion opening 130. At this stage, the disc cartridge 500 can be inserted, through the opening 200, into the cartridge holder 200. In other words, in FIG. 9, the cartridge holder 200 is located at the insertion/withdrawal position. At this stage, the guide pins 250 are located at the front end side of the second grooves 164.

In FIG. 9, the disc cartridge 500 is inserted in the cartridge holder 200 located at the insertion/withdrawal position, and the cartridge holder 200 integrally holds the inserted disc cartridge 500.

The magnet supporting arm 430 is biased clockwise, in FIG. 9, about the magnet supporting shaft 402 by the biasing force of the biasing member 460. The magnet supporting shaft 440 contacts the lower surface 416D of the upper plate 416 of the cam member 410, and vertical movement of the magnet supporting shaft 440 is restricted thereby. Therefore, at this stage, the magnet supporting arm 430 is held to extend substantially horizontally.

The magnet 420 is biased counterclockwise, in FIG. 9, about the magnet supporting shaft 440 by the biasing force of the biasing member 450. Therefore, the second contacting portions 428 contact the lower surface of the intermediate portion 432A of the magnet supporting arm 430, and the magnet 420 is held to extend substantially horizontally, similarly to the magnet supporting arm 430.

In the condition shown in FIG. 9, the magnet 420 is located at the position spaced from the upper surface 504 of the disc cartridge 500 so as not to interfere with the movement of the disc cartridge 500.

When the disc cartridge 500 is inserted into the cartridge holder 200 as shown in FIG. 9, and the insertion is detected by the sensor (not shown), the cartridge holder 200 is introduced inside the disc drive (i.e., moved horizontally in the rear direction) by the driving mechanism (not shown).

Figure 10:
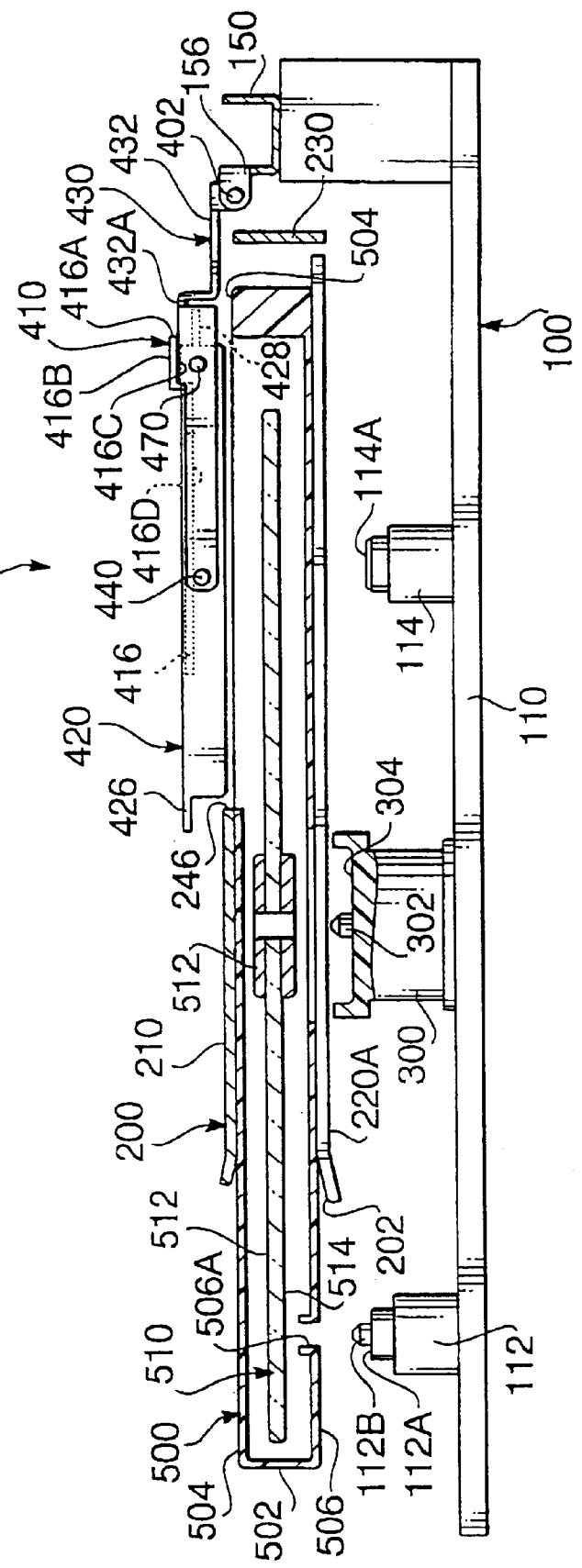
FIG. 10 shows a condition where the cartridge holder is located at a horizontal movement completion position.

FIG. 10 shows a condition in which the movement of the cartridge holder 200 in the horizontal direction has been completed. At this stage, the guide pins 250 are located at the rear ends of the second grooves 164.

When the cartridge holder 200 located at a position shown in FIG. 9 moves horizontally to the position shown in FIG. 10, the magnet supporting shaft 440 moves horizontally along the lower surface 416D of the upper plate 416 with being contacted therewith. Therefore, when the cartridge holder 200 moves from the position shown in FIG. 9 to the position shown in FIG. 10, the magnet supporting arm 430 keeps extending horizontally.

The magnet 420 maintains a condition in which the second contacting portions 428 contact the lower surface of the intermediate section 432A, and therefore, the magnet 420 also extends horizontally during the horizontal movement of the cartridge holder 200.

In the embodiment, each part of the cam member 410 is designed to have appropriate size and the cam member 410 is provided at an appropriate position of the cartridge holder 200 so that, when the cartridge holder 200 is located at a position shown in FIG. 10, the lower surface 416C of the stepped portion 416B of the cam member 410 faces the guide pin 470.

In should be noted that, when the surface 416C faces the guide pin 470, only the surface 416C and the guide pin 470 contribute to the rocking movement of the magnet supporting arm 430, and therefore, the front-side sizes of the cam member 410 and the upper plate 416 may be designed so that the engagement between the cam member 410 with the magnet supporting shaft 440 is released.

At this stage, the peripheral portion 246 of the cutout portion 240 of the upper plate 210 has been moved to a position facing the first contacting portion 426 of the magnet 420. Further, a rear side portion, with respect to the opening, of the upper surface 504 of the housing 502 has been moved to a position where the rear side portion of the upper surface 504 faces the second contacting portions 428.

Further, when the cartridge holder 200 has been located at the position shown in FIG. 10, the positioning holes 506A of the disc cartridge 500 has been located at predetermined positions, respectively, at which the positioning holes 506A face the contacting surface 112A and positioning pin 112B of the positioning section 112.

Figure 11:
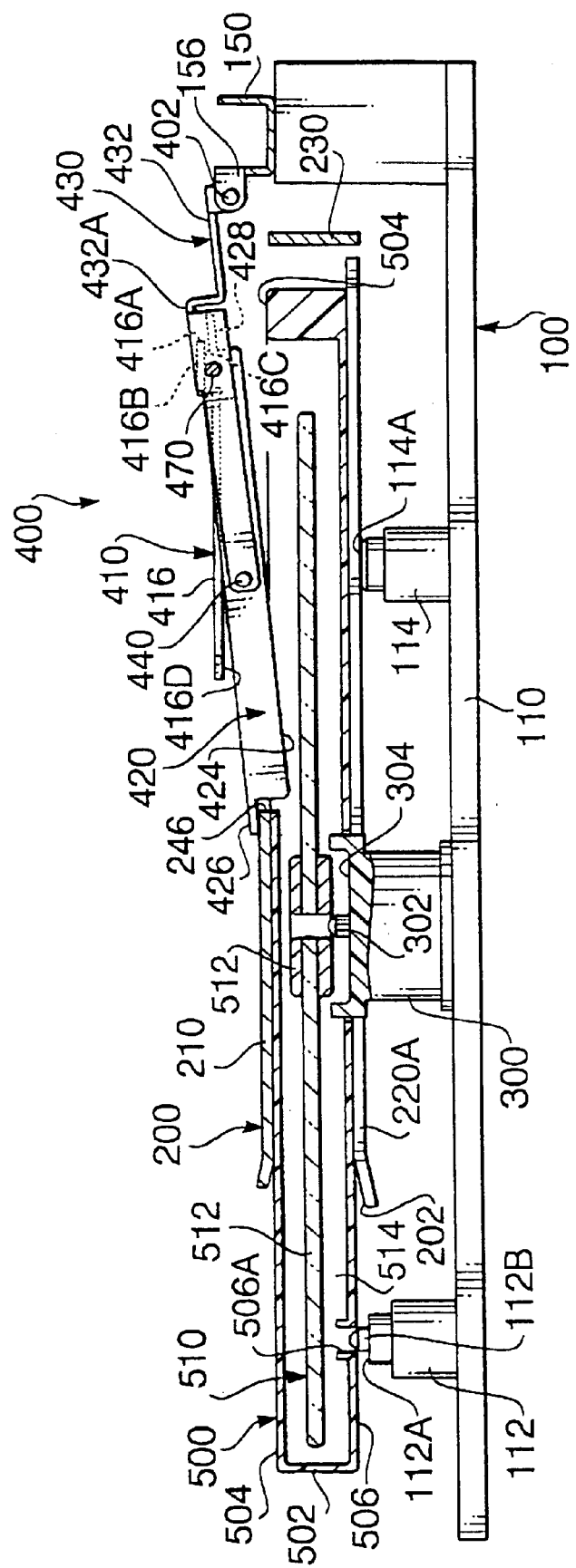
FIG. 11 shows a condition where the cartridge holder is located at an intermediate position when it is vertically moved.

FIG. 11 shows a condition where the cartridge holder 200 is located at an intermediate position during its vertical movement. That is, in this condition, each of the guide pins 250 is located at the intermediate position within the corresponding third groove 166.

That is, while the cartridge holder 200 moves vertically from the position shown in FIG. 10, the cam member 410 moves integrally with the cartridge holder 200. During this movement, the lower surface 416C of the stepped portion 416B moves downward with the guide pin 470 contacting the lower surface 416C of the stepped portion 416B. Therefore, the magnet supporting arm 430 rocks downward (i.e., counterclockwise in FIG. 11) about the supporting shaft 402, against the biasing force applied by the biasing member 460.

As the magnet 420 rocks integrally with the magnet supporting arm 430 in a direction in which the magnet 420 approaches the upper surface of the magneto-optical disc 510, the first contacting portion 426 contacts the peripheral portion 246 of the cut out portion 240 of the cartridge holder 200.

When the magnet supporting arm 430 is further moved downward with the first contacting portion 426 contacting the peripheral portion 426, the magnet 420 rocks clockwise in FIG. 11, against the biasing force of the biasing member 450, about the magnet supporting shafts 440 and 442, with the first contacting portion 426 contacting the peripheral portion 246.

As the magnet 420 rocks clockwise, the second contacting portions 428 depart from the lower surface of the intermediate portion 432A of the magnet supporting arm 430, and is moved toward the upper surface 504 of the housing 502.

By the downward movement of the cartridge holder 200, the positioning hole 506A of the disc cartridge 500 is moved so as to approach the positioning pin 112B of the cartridge positioning section 112, and the lower surface 502 of the housing 506 approaches the positioning surfaces 112A and 114A of the cartridge positioning section 112 and 114, respectively.

FIG. 12 shows a condition where the vertical movement of the cartridge holder 200 has completed. At this stage, the guide pins 250 in FIG. 2 is located at the lower ends of the corresponding third grooves 166.

At this stage, the first contacting section 426 contacts the peripheral portion 246, and the second contacting portion 428 contacts the upper surface 504 of the housing. Since the guide pin 470 of the magnet supporting arm 430 is pushed downward, against the biasing force applied by the biasing member 450, by the stepped portion 416B of the cam member 410, the second contacting portion 428 of the magnet 420 contacts the upper surface 504 of the housing 502.

When the cartridge holder 200 is moved to the loading position as shown in FIG. 12, the positioning pin 112B is inserted in the positioning hole 506A, and the lower surface 506 of the housing 502 contacts the positioning surfaces 112A and 114A of the cartridge positioning section 112 and the cartridge receiving section 114, respectively. Thus, the positioning of the disc cartridge 500 in the horizontal and vertical directions is completed.

Further, the hub 512 of the magneto-optical disc 510 is caught by the chucking section 304 of the spindle motor 300, thereby the positioning of the magneto-optical disc 510 with respect to the base plate 110, in the horizontal and vertical directions, is completed.

As described above, the second contacting portion 428 of the magnet 420 contacts the upper surface 504 of the housing 502 of the disc cartridge 500, positioning of which has been completed, and the first contacting portion 426 contacts the peripheral portion 246 of the cut out portion of the cartridge holder 200, which holds the disc cartridge 500 integrally.

With the above configuration, the magnet 420 is accurately positioned with respect to the housing 502. Further, positioning of the first and second contacting portions 426 and 428 with respect to the base plate 110 have been completed. Thus, the positioning of the magneto-optical disc 510 with respect to the base plate 110 is achieved.

As afore-mentioned, the housing 502 of the cartridge 500 is manufactured following the predetermined standard. Therefore, once the positioning of the first and second contacting sections 426 and 428 is done with respect to the housing 502, the magnet 420 is accurately positioned, i.e., the magnet 420 is oriented in parallel with the upper surface 512 of the magneto-optical disc 510, and the distance between the magnet 420 and the upper surface 512 of the magneto-optical disc 510 has a specified value.

Specifically, since the magnet 420 is positioned accurately with respect to the magneto-optical disc 510, it becomes possible to locate the magnet 420 more closely and sufficiently adjacent to the upper surface 512 of the magneto-optical disc 510 in comparison with a conventional biasing magnet positioning mechanism. Therefore, even if the magnet 420 is of a small one having a relatively weak magnetic field, a sufficient magnetic field can be applied onto the magneto-optical disc 510 by adjusting the distance therebetween. That is, the magnet 420 can be made small in size according to the embodiment.

It should be noted that, in the above-described embodiment, the second contacting portion 428 contacts the upper surface 504 of the housing 502. Alternatively, it is configured such that the second contacting portion 428 contacts the upper surface of a rear end portion of the shutter. In this case, if the shutter is made of metal, wearing of the shutter by the second contacting portion 428 will be suppressed.

As described above, the shutter is also manufactured in accordance with the predetermined standard, and therefore, if the positioning of the first and second contacting portions 426 and 428 is achieved with respect to part of the shutter, the magnet can be positioned accurately with respect to the magneto-optical disc 510.

As explained above, according to the embodiment, the magnet is provided with a first contacting portion at a portion, along its extending direction, closer to the rotational axis of the magneto-optical disc, and a second contacting portion at a portion further from the rotational axis of the magneto-optical disc. When the disc cartridge is moved from the cartridge insertion/withdrawal position to the loading position, the first contacting portion is made to contact a part of the cartridge holder, and the second contacting portion is made to contact a part of the disc cartridge so that the positioning of the magnet is achieved. With this configuration, since both the first and second contacting portions provided to the magnet are positioned with respect to the disc cartridge, the biasing magnet can be positioned accurately with respect to the magneto-optical disc.

It should be noted that the present invention is not limited by what has been described above. Rather, the invention is set forth in the claims. In the claims, the terms "comprising", "including" or the like means "including but not limited to."

The present disclosure relates to the subject matter contained in Japanese Patent Application No. HEI 11-185389, filed on Jun. 30, 1999, which is expressly incorporated herein by reference in its entirety.

What is claimed is:

1. A biasing magnet positioning mechanism for a magneto-optical disc drive, comprising:

a cartridge holder that detachably holds a disc cartridge accommodating a magneto-optical disc, the disc cartridge being formed with an opening for exposing a part of a surface of the magneto-optical disc accommodated therein;

a cartridge holder moving mechanism that moves said cartridge holder, within a chassis, between a cartridge insertion/withdrawal position at which the disc cartridge can be inserted in or withdrawn from said cartridge holder, and a loading position at which data recording/reproducing operation can be performed;

a biasing magnet for applying a magnetic field to the magneto-optical disc, said biasing magnet being provided with a first contact portion on a side closer to a rotational axis of the magneto-optical disc and a second contact portion on a side farther from the rotational axis of the magneto-optical disc, said first contact portion contacting said cartridge holder when said cartridge holder is located at said loading position, said second contact portion contacting the disc cartridge when said cartridge holder is located at said loading position, said biasing magnet being positioned to face the magneto-optical disc through the opening formed on said disc cartridge at a predetermined distance spaced from a surface of the magneto-optical disc when said first contact portion contacts said cartridge holder and said second contact portion contacts said disc cartridge.

2. The biasing magnet positioning mechanism according to claim 1, wherein said cartridge holder is moved from said insertion/withdrawal position to said loading position through a horizontal path horizontally extending from said insertion/withdrawal position and a vertical path extending downward from an end of said horizontal path.

3. The biasing magnet positioning mechanism according to claim 1, wherein a spindle motor for rotating the magneto-optical disc is provided on said chassis, a positioning of said disc cartridge in the vertical direction being achieved by said chassis, a positioning of the magneto-optical disc in the vertical direction being achieved by said spindle motor.

4. The biasing magnet positioning mechanism according to claim 1, further comprising a magnet supporting arm provided on said chassis for rotatably supporting said biasing magnet, said magnet supporting arm being rockable about an axis which is parallel to a surface of the magneto-optical disc and is perpendicular to a radial direction of the magneto-optical disc in which said biasing magnet extends.

5. The biasing magnet positioning mechanism according to claim 4, wherein said magnet supporting arm is provided with a first engaging portion, wherein said cartridge holder is provided with a second engaging portion to engage said first engaging portion, the rocking movement of said magnet supporting arm being performed when said second engaging portion moves vertically.

6. The biasing magnet positioning mechanism according to claim 5, wherein said second engaging portion biases said first engaging portion such that said magnet supporting arm is located at a predetermined position when said cartridge holder is located at said loading position.

7. The biasing magnet positioning mechanism according to claim 6, wherein said second engaging portion is formed with elastic material.

8. The biasing magnet positioning mechanism according to claim 4, wherein said biasing magnet is supported by said magnet supporting arm such that said biasing magnet is rockable about an axis which is parallel with the rotational axis of said magnet supporting arm, at a substantially central portion of said biasing magnet in its extending direction.

9. The biasing magnet positioning mechanism according to claim 1, wherein said disc cartridge includes a housing on which said opening is formed, a shutter being provided for closing said opening, said second contact portion contacting a part of said housing when said cartridge holder is located at said loading position.

10. The biasing magnet positioning mechanism according to claim 1, wherein said disc cartridge includes a housing on which said opening is formed, a shutter being provided for closing said opening, said second contact portion contacting a part of said shutter when said cartridge holder is located at said loading position.

11. A magneto-optical disc drive, comprising:
a cartridge holder that detachably holds a disc cartridge accommodating a magneto-optical disc, the disc cartridge being formed with an opening for exposing a part of a surface of the magneto-optical disc accommodated therein;
a cartridge holder moving mechanism that moves said cartridge holder, within a chassis, between a cartridge insertion/withdrawal position at which the disc cartridge can be inserted in or withdrawn from said cartridge holder, and a loading position at which data recording/reproducing operation can be performed:
a biasing magnet for applying a magnetic field to the magneto-optical disc, said biasing magnet being provided with a first contact portion on a side closer to a rotational axis of the magneto-optical disc and a second contact portion on a side farther from the rotational axis of the magneto-optical disc, said first contact portion contacting said cartridge holder when said cartridge holder is located at said loading position, said second contact portion contacting the disc cartridge when said cartridge holder is located at said loading position, said biasing magnet being positioned to face the magneto-optical disc through the opening formed on said disc cartridge at a predetermined distance spaced from a surface of the magneto-optical disc when said first contact portion contacts said cartridge holder and said second contact portion contacts said disc cartridge.

12. The disc drive according to claim 11, wherein said cartridge holder is moved from said insertion/withdrawal position to said loading position through a horizontal path horizontally extending from said insertion/withdrawal position and a vertical path extending downward from an end of said horizontal path.

13. The disc drive according to claim 11, wherein a spindle motor for rotating the magneto-optical disc is provided on said chassis, a positioning of said disc cartridge in the vertical direction being achieved by said chassis, a positioning of the magneto-optical disc in the vertical direction being achieved by said spindle motor.

14. The disc drive according to claim 11, further comprising a magnet supporting arm provided on said chassis for rotatably supporting said biasing magnet, said magnet supporting arm being rockable about an axis which is parallel to a surface of the magneto-optical disc and is perpendicular to a radial direction of the magneto-optical disc in which said biasing magnet extends.

15. The disc drive according to claim 14, wherein said magnet supporting arm is provided with a first engaging portion, wherein said cartridge holder is provided with a second engaging portion to engage with said first engaging portion, the rocking movement of said magnet supporting arm being performed when said second engaging portion moves vertically.

16. The disc drive according to claim 15, wherein said second engaging portion biases said first engaging portion such that said magnet supporting arm is located at a predetermined position when said cartridge holder is located at said loading position.

17. The disc drive according to claim 16, wherein said second engaging portion is formed with elastic material.

18. The disc drive according to claim 14, wherein said biasing magnet is supported by said magnet supporting arm such that said biasing magnet is rockable about an axis which is parallel with the rotational axis of said magnet supporting arm, at a substantially central portion of said biasing magnet in its extending direction.

19. The disc drive according to claim 11, wherein said disc cartridge includes a housing on which said opening is formed, a shutter being provided for closing said opening, said second contact portion contacting a part of said housing when said cartridge holder is located at said loading position.

20. The disc drive according to claim 11, wherein said disc cartridge includes a housing on which said opening is formed, a shutter being provided for closing said opening, said second contact portion contacting a part of said shutter when said cartridge holder is located at said loading position.

* * * * *